United States Patent
Yun et al.

(10) Patent No.: US 10,091,141 B2
(45) Date of Patent: Oct. 2, 2018

(54) METHOD AND DEVICE FOR PROVIDING COMMUNICATION BETWEEN MULTI-DEVICES

(71) Applicant: SAMSUNG ELECTRONICS CO., LTD., Suwon-si, Gyeonggi-do (KR)

(72) Inventors: Jeong-hyun Yun, Suwon-si (KR); Kyung-ah Chang, Seoul (KR); Jong-deok Choi, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 221 days.

(21) Appl. No.: 14/919,090

(22) Filed: Oct. 21, 2015

(65) Prior Publication Data

US 2016/0119257 A1    Apr. 28, 2016

(30) Foreign Application Priority Data

Oct. 27, 2014 (KR) ........................ 10-2014-0146428

(51) Int. Cl.
*G06F 15/16* (2006.01)
*H04L 12/58* (2006.01)
(Continued)

(52) U.S. Cl.
CPC .......... *H04L 51/02* (2013.01); *H04L 12/2823* (2013.01); *H04L 51/046* (2013.01); *H04L 51/18* (2013.01); *H04L 67/10* (2013.01); *H04L 67/1097* (2013.01); *H04L 67/26* (2013.01); *H04L 67/306* (2013.01); *H04W 4/003* (2013.01); *H04W 4/60* (2018.02)

(58) Field of Classification Search
CPC ..... H04L 67/10; H04L 51/18; H04L 67/1097; H04L 67/26; H04L 51/046; H04L 67/306; H04L 12/2823

USPC ........................................................ 709/206
See application file for complete search history.

(56) References Cited

U.S. PATENT DOCUMENTS

| | | | | |
|---|---|---|---|---|
| 2009/0013269 | A1* | 1/2009 | Khandpur | G06F 3/0481 715/764 |
| 2011/0289161 | A1* | 11/2011 | Rankin, Jr. | G06Q 10/107 709/206 |

(Continued)

FOREIGN PATENT DOCUMENTS

KR    10-1363115    2/2014

OTHER PUBLICATIONS

Amazon Simple Queue Service Getting Started Guide API Version Nov. 5, 2012.*

(Continued)

*Primary Examiner* — Chris Parry
*Assistant Examiner* — Weiwei Stiltner
(74) *Attorney, Agent, or Firm* — Nixon & Vanderhye, P.C.

(57) ABSTRACT

A method of providing communication between a plurality of devices of a user without a dedicated server and a device capable of communicating with other devices by using the method are disclosed. The method includes generating a message to be sent to a second device and storing a channel file including message data in a predetermined space within a cloud server, which are performed by a first device, and accessing the cloud server and reading a channel file stored in a predetermined place within the cloud server, which are performed by the second device.

20 Claims, 12 Drawing Sheets

(51) Int. Cl.
  *H04W 4/60* (2018.01)
  *H04L 12/28* (2006.01)
  *H04L 29/08* (2006.01)
  *H04W 4/00* (2018.01)

(56) References Cited

U.S. PATENT DOCUMENTS

| | | | |
|---|---|---|---|
| 2012/0265803 A1 | 10/2012 | Ha et al. | |
| 2013/0159490 A1 | 6/2013 | Huh et al. | |
| 2013/0275530 A1* | 10/2013 | Matson | H04L 51/24 709/206 |
| 2013/0339454 A1* | 12/2013 | Walker | H04L 51/04 709/206 |
| 2014/0047526 A1 | 2/2014 | Huang | |
| 2014/0053245 A1 | 2/2014 | Tosa et al. | |
| 2014/0053283 A1 | 2/2014 | Odom et al. | |
| 2014/0244766 A1* | 8/2014 | Mo | G06F 9/541 709/206 |
| 2015/0067072 A1* | 3/2015 | Yin | H04L 51/30 709/206 |
| 2015/0081816 A1* | 3/2015 | Trevelyan | H04L 51/14 709/206 |
| 2015/0215241 A1* | 7/2015 | Zhou | H04L 51/14 709/206 |
| 2015/0350152 A1* | 12/2015 | Flores | H04L 51/34 709/206 |
| 2016/0048114 A1* | 2/2016 | Matthieu | G05B 15/02 700/83 |

OTHER PUBLICATIONS

Soliman, Smart Home: Integrating Internet of Things with Web Services and Cloud Computing, IEEE, 2013.*

* cited by examiner

FIG. 5

| START | SENDING DEVICE | SENDING TIME | CHECK RECEIPT OF MESSAGE | MESSAGE TYPE | MESSAGE SIZE | CONTENTS OF MESSAGE | ECC | END |
|---|---|---|---|---|---|---|---|---|

METHOD AND DEVICE FOR PROVIDING COMMUNICATION BETWEEN MULTI-DEVICES

CROSS-REFERENCE TO RELATED APPLICATION

This application is based on and claims priority under 35 U.S.C. § 119 to Korean Patent Application No. 10-2014-0146428, filed on Oct. 27, 2014, in the Korean Intellectual Property Office, the disclosure of which is incorporated by reference herein in its entirety.

BACKGROUND

1. Field

The disclosure relates to methods and apparatuses for providing communication between multi-devices, and for example, to methods of providing communication between a plurality of devices without a dedicated server and devices capable of communicating with other devices by using the methods.

2. Description of the Related Art

As the Internet network spreads widely among general consumers due to the development of communication technology, various kinds of services using the Internet have been developed. Particularly, as personal terminals such as smartphones are widely spread recently, environments for going online regardless of the time and place have been created. Also, wired or wireless internet communication technology tends to be applied to general home appliances as well as smartphones. Accordingly, a need for providing communication between various devices is increasing.

For example, the digital living network alliance (DLNA) may provide communication between various devices within a local area via direct connection therebetween. However, in order to provide communication between devices in a remote place, a dedicated server is generally necessary, and accordingly, server cost may be additionally incurred. Also, for connection to the dedicated server, a dedicated application has to be installed in each and every one of the devices.

SUMMARY

Provided are methods and apparatuses for providing communication between multi-devices.

Additional aspects will be set forth in part in the description which follows and, in part, will be apparent from the description.

According to an aspect of an example embodiment, a method of providing communication between multi-devices includes: generating, performed by a first device, a message to be sent to a second device different from the first device; storing, performed by the first device, the message in a previously designated storage space of a cloud server; searching the previously designated storage space of the cloud server and reading a message sent to the second device, both performed by the second device; and processing, performed by the second device, the message sent to the second device.

The first device and the second device may access the cloud server based on the same user account information regarding the cloud server.

The previously designated storage space of the cloud server may include a folder allocated to a user account of the cloud server or a subfolder of the folder.

The first device and the second device may access the cloud server based on different user account information, respectively.

The previously designated storage space of the cloud server may include a common storage space of the cloud server, which is shared by different user accounts.

The first device may store the message to be sent to the second device as a file including contents of the message in the previously designated storage space of the cloud server.

At least one file including contents of a message may be stored in the previously designated storage space of the cloud server, and each of the at least one file may correspond to a device that is to receive a message included in each of the at least one file.

At least one folder for storing the file including the contents of the message may be created in the previously designated storage space of the cloud server, and each of the at least one folder may correspond to a device that is to receive a message that a file stored in each of the at least one folder includes.

The file may include, along with the contents of the message, information regarding a device sending the message.

The method may further include: generating, performed by the second device, a response message to be sent to the first device after the processing of the message sent to the second device; storing, performed by the second device, the response message in the previously designated storage space of the cloud server; searching the previously designated storage space of the cloud server and reading a response message sent to the first device, both performed by the first device; and processing, performed by the first device, the response message sent to the first device.

The method may further include accessing the cloud server and checking whether there is a message sent to the first and second devices, both performed by the first and second devices, respectively.

When there is no message sent to the first and second devices, the first and second devices may periodically repeat the checking whether there is a message sent to the first and second devices until a received message is found.

The cloud server may include a first cloud server and a second cloud server different from the first cloud server, and the first device may store the message to be sent to the second device in a previously designated storage space of the first cloud server when there is a response from the first cloud server, and may store the message to be sent to the second device in a previously designated storage space of the second cloud server when there is no response from the first cloud server.

The method may further include accessing the cloud server and registering device information regarding the first device on the cloud server, both performed by the first device.

Registering the device information regarding the first device may include: receiving an input of a user account of the cloud server; accessing the cloud server based on the input user account; searching for a device information file stored in the previously designated storage space of the cloud server; and adding the device information regarding the first device to the device information file and storing a renewed device information file.

The method may further include, when there is no device information file in the previously designated storage space of the cloud server, creating a device information file including the device information regarding the first device and storing the device information file in the previously designated storage space of the cloud server.

According to an aspect of another example embodiment, a method of communicating with another device using a cloud server, the method performed by a device, includes: generating a message to be sent to the another device; accessing the cloud server based on previously input user account information and storing the message as a file in a previously designated storage space of the cloud server; searching the previously designated storage space of the cloud server and checking whether a file including a message sent to the device from the other device has been stored; and when there is the file including the message sent to the device, reading and processing the message sent to the device.

The previously designated storage space of the cloud server may include a folder allocated to a user account of the cloud server or a subfolder of the folder.

The method may further include registering device information regarding the device on the cloud server, wherein the registering of the device information regarding the device may include: receiving an input of a user account of the cloud server; accessing the cloud server based on the input user account; searching for a device information file stored in the previously designated storage space of the cloud server; and adding the device information regarding the device to the device information file and storing a renewed device information file.

The method may further include, when there is no device information file in the previously designated storage space of the cloud server, creating a device information file including the device information regarding the device and storing the device information file in the previously designated storage space of the cloud server.

The method may further include obtaining information regarding other devices capable of performing communication with the device from the device information file.

According to an aspect of another example embodiment, a device includes: a memory configured to store at least one program; and a processor configured to perform communication between multi-devices by executing the at least one program, wherein the at least one program includes commands for: generating a message to be sent to another device; accessing a cloud server based on previously input user account information and storing the message as a file in a previously designated storage space of the cloud server; searching the previously designated storage space of the cloud server and checking whether a file including a message sent to the device from the other device has been stored; and when there is the file including the message sent to the device, reading and processing the message sent to the device.

According to an aspect of another example embodiment, there is provided a non-transitory computer-readable recording medium having recorded thereon a program for performing, when executed by a computer, the method of communicating with another device by using a cloud server, the method performed by a device.

BRIEF DESCRIPTION OF THE DRAWINGS

These and/or other aspects will become apparent and more readily appreciated from the following detailed description, taken in conjunction with the accompanying drawings in which like reference numerals refer to like elements, and wherein:

FIG. 5 illustrates an example of a data format of a channel file related to each device;

DETAILED DESCRIPTION

Figure 1:
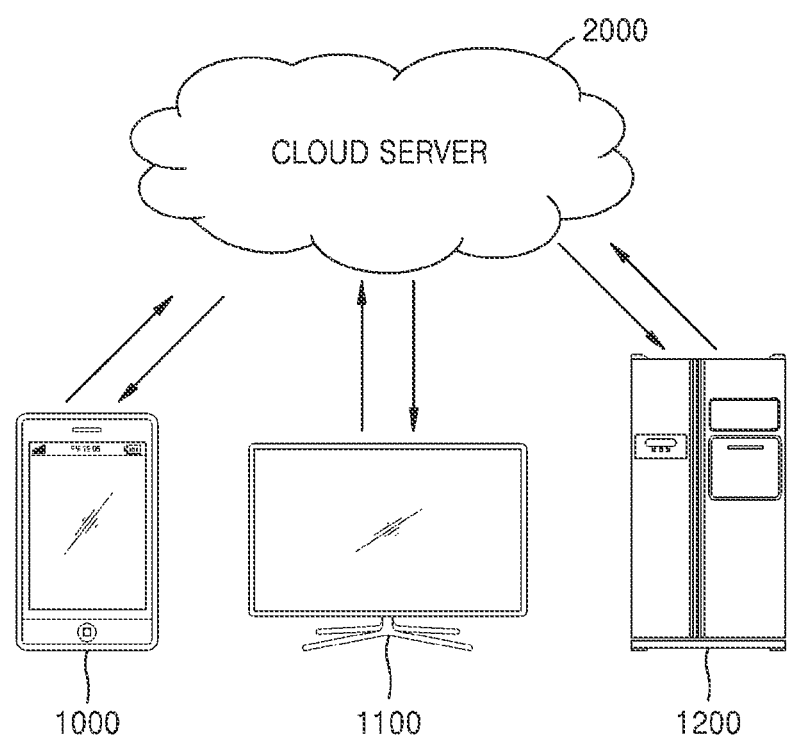
FIG. 1 is a schematic system configuration diagram illustrating an example method of providing communication between multi-devices by using a cloud server.

As the disclosure allows for various changes and numerous embodiments, example embodiments will be illustrated in the drawings and described in detail below. However, this is not intended to limit the disclosure to particular modes of practice, and it will be appreciated that all changes, equivalents, and substitutes that do not depart from the spirit and technical scope of the disclosure are encompassed. In the description, certain detailed explanations of the related art are omitted when it is deemed that they may unnecessarily obscure the essence of the disclosure.

While such terms as "first" and "second" may be used to describe various elements, the elements are not limited by the terms. The terms are used only for the purpose of distinguishing one element from another element.

The terms used herein are merely used to describe example embodiments and are not intended to limit the disclosure. The terms used herein are selected from among common terms that are currently widely used in consideration of the function of the disclosure. However, the terms may be different according to an intention of one of ordinary skill in the art, a precedent, or the advent of new technology. Also, in particular cases, the terms are selected by the applicant, and the meaning of those terms will be described in detail in the corresponding part of the detailed description. Therefore, the terms used herein are not merely designations of the terms, but the terms are defined based on the meaning of the terms and content throughout the disclosure.

The singular forms "a," "an," and "the" are intended to include the plural forms as well, unless the context clearly indicates otherwise. Also, when a part "includes" an element, it is to be understood that the part additionally includes other elements rather than excluding other elements as long as there is no particular opposing recitation. Also, the terms such as " . . . unit", "module", or the like used in the disclosure indicate an unit processing at least one function or motion, and the unit may be implemented by hardware (including, for example, circuitry, processing circuitry, etc.) or software, or by a combination of hardware and software.

Throughout the disclosure, when an element is referred to as being "connected" or "coupled" to another element, it may be "directly connected or coupled" to the other element or "electrically connected or coupled" with intervening elements.

Throughout the disclosure, connection between two devices may be construed as meaning that the two devices are connected so as to exchange data with each other and does not necessarily refer to physical connection between the two devices.

Also, the term "file" used herein may include not only a computer file generally used in the field of computer technology but also a "folder" grouping computer files.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not necessarily modify the individual elements of the list.

The example embodiments will now be described in detail with reference to the accompanying drawings.

FIG. 1 is a schematic system configuration diagram illustrating an example method of providing communication between multi-devices using a cloud server 2000.

Referring to FIG. 1, the cloud server 2000, which may, for example, be an apparatus providing a storage space accessible via a network, may allocate and provide storage spaces to a plurality of users based on user accounts. The cloud server 2000 may have a file system and provide data access at a file level to a user. Accordingly, when devices 1000, 1100, and 1200 are connected to the network, the devices 1000, 1100, and 1200 may access data of the user stored in the cloud server 2000 anywhere and at any time by using user account information. The devices 1000, 1100, and 1200 may access the cloud server 2000 via the network, based on a cloud server account of the user, and may store a file in a storage space allocated to the cloud server 2000 or receive a file stored in the storage space.

The devices 1000, 1100, and 1200 may communicate with the cloud server 2000 via wired or wireless network. For example, the devices 1000, 1100, and 1200 may communicate with the cloud server 2000 using telecommunication networks, such as third-generation (3G) telecommunication networks, fourth-generation (4G) telecommunication networks, or wireless fidelity (Wi-Fi), but example embodiments are not limited thereto. In this regard, the devices 1000, 1100, and 1200 may include a smartphone, a cellular phone, a personal digital assistant (PDA), a portable multimedia player (PMP), a laptop computer, a media player, a personal computer (PC), other mobile or non-mobile computing apparatuses, and many kinds of electronic devices. For example, the devices 1000, 1100, and 1200 may include a television (TV), a lighting apparatus, a refrigerator, a stereo, a washing machine, an air conditioner, a digital camera, an oven, a gas stove, a home gateway, a game device, an electronic board, a touch table, a watch, a navigation device, and an MP3 player, but exemplary embodiments are not limited thereto. Accordingly, the devices 1000, 1100, and 1200 may include any electronic device that may access the cloud server 2000 via a wired or wireless network. Although only the three devices 1000, 1100, and 1200 are illustrated as an example in FIG. 1 for convenience, example embodiments are not limited thereto, and there is no limit to the number of devices that may access the cloud server 2000.

The devices 1000, 1100, and 1200 may exchange messages, data, or commands for performing certain operations with one another using a storage space provided by the cloud server 2000. For example, FIG. 2 is a flowchart illustrating an example method, performed by two devices 1000 and 1100, of performing communication with each other by using the cloud server 2000.

Figure 2:
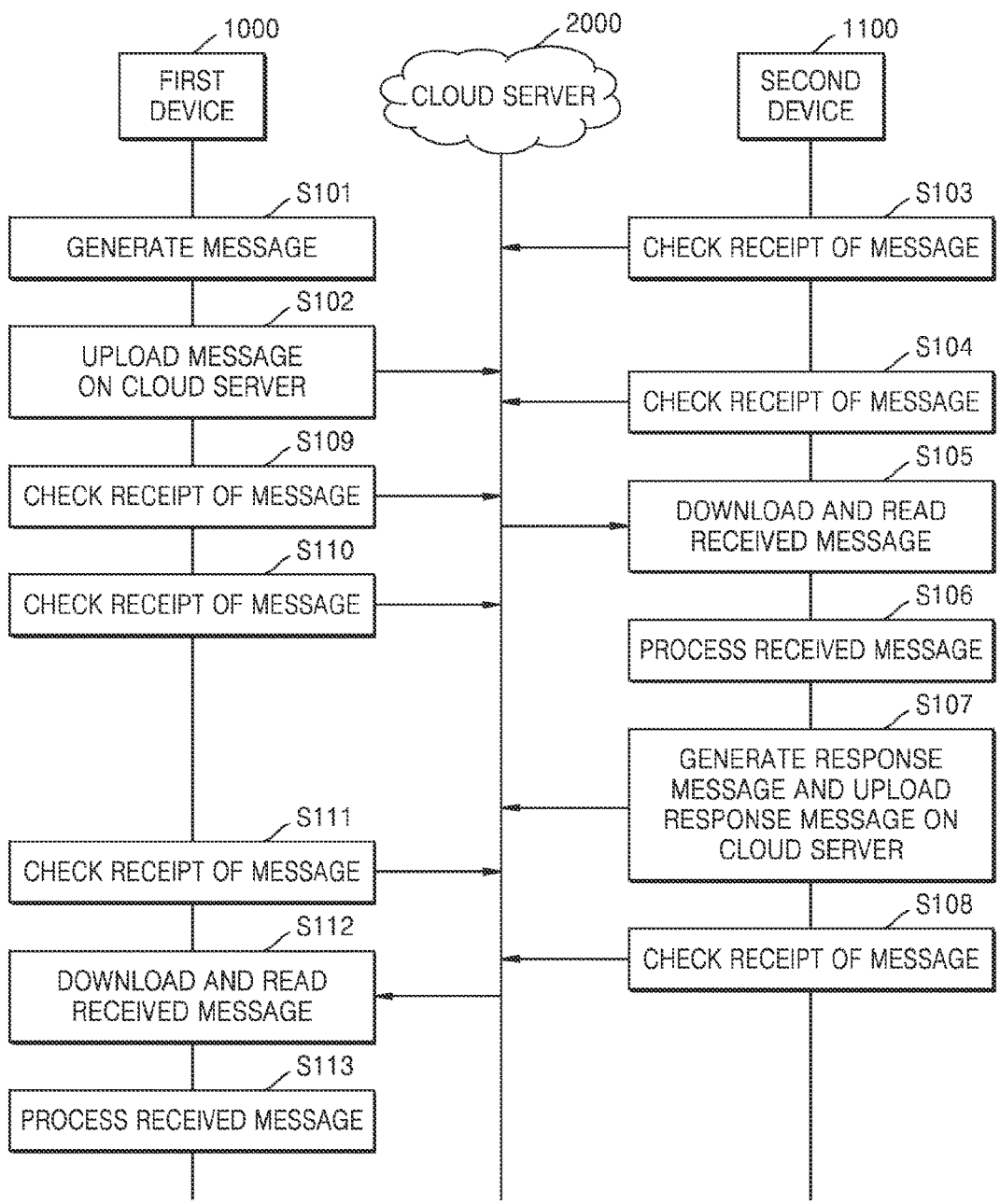
FIG. 2 is a flowchart illustrating an example method, performed by two devices, of performing communication with each other by using a cloud server.

Referring to FIG. 2, in operation S101, a first device 1000 generates a message to be sent to a second device 1100. The generating of the message may, for example, be performed when a user of the first device 1000 directly inputs contents to the first device 1000 and instructs the first device 1000 to transmit the contents to the second device 1100. Alternatively, when the user selects data stored in the first device 1000 and instructs the first device 1000 to transmit the data to the second device 1100, or the user orders the second device 1100 to perform a certain operation by using the first device 1000, the first device 1000 may generate the message based on the order. Alternatively, while a certain operation previously input to the first device 1000 is performed, the first device 1000 may automatically generate the message to be sent to the second device 1100.

In operation S102, the first device 1000 accesses the cloud server 2000 and uploads the message to a previously designated storage space in the cloud server 2000. For this, user account information regarding the cloud server 2000 to be accessed may have been previously input to the first device 1000. Accordingly, the first device 1000 may access the cloud server 2000 based on the previously input user account information regarding the cloud server 2000. Also, information about a location in the storage space of the cloud server 2000, where the message is to be uploaded, may have been previously set on the first device 1000.

In operation S103, the second device 1100 accesses the cloud server 2000 and checks whether there is a message sent to the second device 1100. For this, user account information regarding the cloud server 2000 that is identical to that input to the first device 1000 may have been input to the second device 1100 as well. Also, information about a location in the storage space of the cloud server 2000, where the message is to be read, may have been previously set on the second device 1100. Accordingly, the second device 1100 may access the cloud server 2000 based on the previously input user account information regarding the cloud server 2000, search the storage space of the cloud server 2000, the information of which has been previously input to the second device 1100, and receive the message.

When the cloud server 2000 provides a common storage place for different user accounts, communication between multi-devices may be provided with pieces of user account information that are different from each other using the common storage place. For example, when user account information regarding the cloud server 2000 that is input to the first device 1000 differs from user account information regarding the cloud server 2000 that is input to the second device 1100, the first and second devices 1000 and 1100 may perform communication using a common storage space (for example, a common folder) of the cloud server 2000 shared by the two user accounts to upload and download messages.

Such a process of checking receipt of a message may be repeated periodically until a received message is found. For example, in operation S104, when there is no received message, the second device 1100 may access the cloud server 2000 again after a period of time and check whether there is a message sent to the second device 1100. For example, the second device 1100 may repeat the process of checking receipt of a message at regular time intervals, such as every 10 seconds, every 30 seconds, every minute, every 5 minutes, or every 10 minutes, etc. A cycle for checking whether there is a received message may be optimized by taking into account factors such as an increase in the load of the cloud server 2000, the amount of power consumption by the second device 1100, and a speed of message transmission. Also, all the devices 1000, 1100, and 1200 do not need to check whether there are received messages at equal cycles. For example, depending on the types of the devices 1000, 1100, and 1200, a device, in which processing a message quickly takes priority, may check whether there is a received message on a relatively short cycle, and a device, in which processing a message quickly is not important, may check whether there is a received message on a relatively long cycle.

In operation S105, when the second device 1100 finds a message sent to the second device 1100, the second device 1100 may download and read the received message. In this regard, the term "download" may mean not only that a message stored in the cloud server 2000 is moved or copied to a non-volatile storage medium of the second device 1100 and stored therein but also that the message stored in the cloud server 2000 is transitorily recorded on a volatile memory of the second device 1100 for message processing.

In operation S106, the second device 11000 may process the received message and perform a certain operation according to the contents of the message. For example, the second device 1100 may simply display text strings included in the message on a screen of the second device 1100 based on the contents of the message or may perform a command included in the message. For example, when the first device 1000 is a smartphone of a user, and the second device 1100 is a TV in a living room, the user outside the living room may use the smartphone to change a channel of the TV in the living room, reserve a power-on of the TV in the living room, or deliver a text message to the user's family in the living room via a screen of the TV in the living room.

Optionally, after processing a message provided by the first device 1000, the second device 1100 may send a result obtained by processing the message to the first device 1000. For example, after generating a response message indicating that the message has been normally processed or the message has failed to be normally processed due to an error, the second device 1100 may access the cloud server 2000 and upload the response message to the previously designated storage space in the cloud server 2000, in operation S107. Generating and uploading the response message do not necessarily need to be performed. Alternatively, no response message may be sent when the message has been normally processed, and the response message may be sent only when the message has failed to be normally processed.

In operation S108, after completing the processing of the message provided by the first device 1000, the second device 1100 may access the cloud server 2000 and repeat checking whether there is a message sent to the second device 1100.

After completing the uploading of the message (operation S102), the first device 1000 may also periodically repeat accessing the cloud server 2000 and checking whether there is a message sent to the first device 1000 until a message sent to the first device 1000 is found, in operations S109 to S111. In operation S112, when the first device 1000 finds a message sent to the first device 1000, the first device 1000 downloads and reads the received message. In operation S113, the first device 1000 may process the received message and perform a certain operation based on the contents of the message. For example, the first device 1000 may receive a response that a message sent to the second device 1100 has been normally processed from the second device 1100 and display the response on a screen of the first device 1000.

Although only the communication between two devices, that is, the first device 1000 and the second device 1100 is illustrated for convenience in the flowchart of FIG. 2, the principle illustrated in the flowchart of FIG. 2 may be applied the same to communication between the three devices 1000, 1100, and 1200 or more as well. For example, one device, for example, the first device 1000, may simultaneously generate a plurality of messages regarding a plurality of other devices, for example, the second and third devices 1100 and 1200, and upload each of the messages to the cloud server 2000. Then, the second and third devices 1100 and 1200 may download each of the messages from the cloud server 2000 and process each of the messages. Alternatively, a plurality of devices, for example, the first and second devices 1000 and 1100, may simultaneously generate messages regarding another device, for example, the third device 1200, and upload the messages to the cloud server 2000. Then, the third device 1200 may download the messages from the cloud server 2000 and sequentially process the messages.

In such a way, the devices 1000, 1100, and 1200 may perform communication with one another by using the cloud server 2000 instead of a dedicated server. Accordingly, the cost of constructing a server may be reduced.

Figure 3:
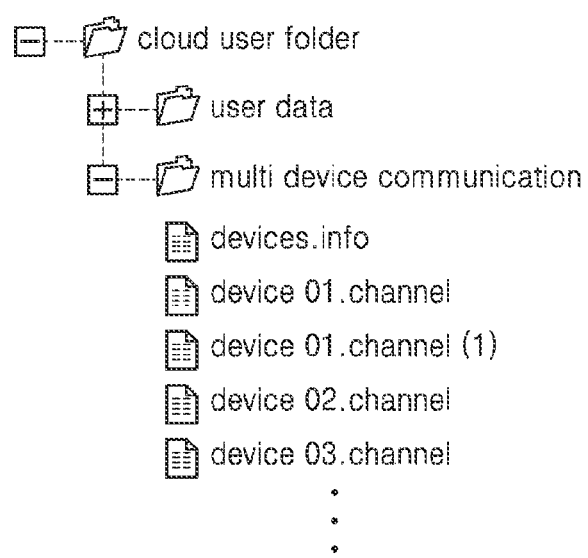
FIG. 3 illustrates an example of a folder and a channel file created in a cloud server to provide communication between multi-devices.

A message for communication between the devices 1000, 1100, and 1200 may be stored as a channel file in the previously designated storage space in the cloud server 2000. For example, FIG. 3 illustrates an example of a folder and a channel file created in the cloud server 2000 to provide communication between multi-devices. In this regard, the channel file may be a file including the contents of a message to be sent to one or more specific devices.

Referring to FIG. 3, in a main folder (for example, cloud user folder) allocated to a user account of the cloud server 2000, a folder (for example, user data) that a user uses for personal purposes and a folder (for example, multi device communication) for communication between multi-devices may be present. Folder "multi device communication" illustrated in FIG. 3 may be a designated storage space in the cloud server 2000 for communication between the devices 1000, 1100, and 1200. That is, in the folder "multi device communication", channel files including the contents of messages for communication between the devices 1000, 1100, and 1200 may be stored. Accordingly, when the devices 1000, 1100, and 1200 upload messages in operations S102 and S107 of FIG. 2, check receipt of messages in operations S103, S104, S108, S109, S110, and S111, or download received messages in operations S105 and S112, the devices 1000, 1100, and 1200 may refer to the folder "multi device communication" in the main folder allocated to the user account of the cloud server 2000. Although FIG. 3 illustrates "multi device communication", which is a subfolder of the main folder allocated to the user account of the cloud server 2000, as an example of a previously designated storage space for communication between multi-devices, this is just an example for ease of understanding, and the channel files may be stored anywhere in the main folder allocated to the user account.

As illustrated as an example in FIG. 3, in the folder "multi device communication", a plurality of channel files (for example, "device 01.channel", "device 01.channel (1)", "device 02.channel", and "device 03.channel") including the contents of a message regarding each of the devices 1000, 1100, and 1200 may be present. For example, file "device 01.channel" and file "device 01.channel (1)" may be channel files including the contents of messages sent to the first device 1000, "device 02.channel" may be a channel file including the contents of a message sent to the second device 1100, and "device 03.channel" may be a channel file including the contents of a message sent to the third device 1200. Likewise, channel files including the contents of messages may respectively correspond to devices which are to receive the messages, and a name of a channel file may be determined so as to be related to a device which is to receive a message.

Such a channel file may be created and uploaded to the folder "multi device communication" in the main folder allocated to the user account of the cloud server 2000 by a device sending a message. For example, after creating the file "device 02.channel" in operation S101 of FIG. 2, the first device 1000 may upload the file "device 02.channel" to the folder "multi device communication" of the cloud server 2000, in operation S102. Also, in operation S107 of FIG. 2, the second device 1100 may create "device 01.channel" or "device 01.channel (1)" and upload "device 01.channel" or "device 01.channel (1)" to the folder "multi device communication".

When a plurality of devices transmit messages to one device almost simultaneously, a plurality of channel files having separate names may be stored in the folder "multi device communication". For example, right after the second device 1100 delivers a message to the first device 1000, the third device 1200 may send a message to the first device 1000 before the first device 1000 processes the message sent to the first device 1000. In this case, the second device 1100 may store channel file "device 01.channel" in the folder "multi device communication". Thereafter, the third device 1200 may store a channel file named "device 01.channel (1)" since the channel file "device 01.channel" already exists. However, instead of creating and storing a plurality of channel files with respect to one device, a new message may be added to the existing channel file. For example, even when a plurality of devices transmit messages to one device almost simultaneously, a channel file regarding the device may always be one, and there may be a plurality of messages in one channel file.

Figure 4:
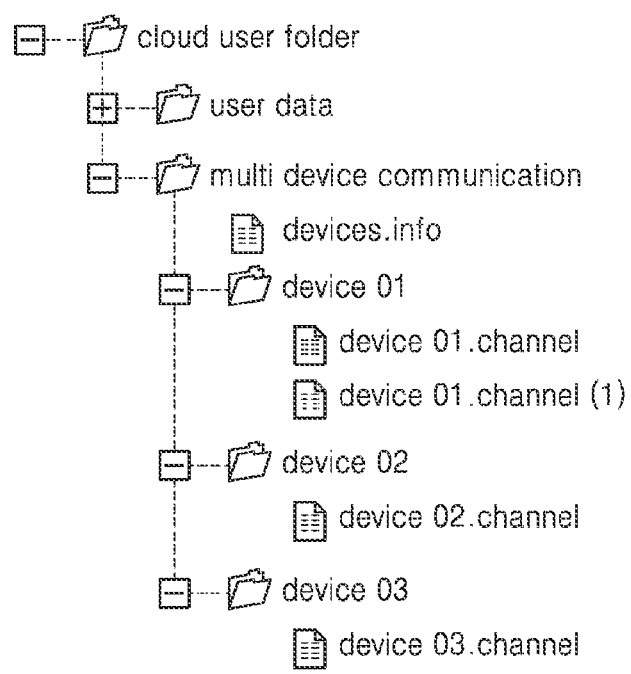
FIG. 4 illustrates another example of a folder and a channel file created in a cloud server to provide communication between multi-devices.

FIG. 4 illustrates another example of a folder and a channel file created in the cloud server 2000 to provide communication between multi-devices. In FIG. 3, channel files regarding all the devices 1000, 1100, and 1200 are stored together in the folder "multi device communication". However, alternatively, as illustrated in FIG. 4, separate folders (for example, "device 01", "device 02", and "device 03") may be present with respect to the devices 1000, 1100, and 1200. For example, channel files "device 01.channel" and "device 01.channel (1)" including messages regarding the first device 1000 may be stored in folder "device 01" for the first device 1000. Channel file "device 02.channel" regarding the second device 1100 may be stored in folder "device 02" for the second device 1100, and channel file "device 03.channel" regarding the third device 1200 may be stored in folder "device 03" for the third device 1200. As described above, the folders "device 01", "device 02", and "device 03" may respectively correspond to the devices 1000, 1100, and 1200 which are to receive messages that channel files stored in the folders include.

FIG. 5 illustrates an example of a data format of a channel file related to each of the devices 1000, 1100, and 1200. Referring to FIG. 5, the channel file may include the code 'start' and the code 'end' respectively indicating a start and end of message data. Between the code 'start' and the code 'end', a code indicating a sending device, an area indicating a sending time, an area displaying whether receipt of a message has been checked, an area indicating a type of the message, an area indicating a size (or length) of the message in bytes, an area indicating the actual contents of the message, and an error correcting code (ECC) may be included. When a plurality of channel files are created and stored with respect to each of the devices 1000, 1100, and 1200, the code 'start' and the code 'end' may be omitted. However, when a new message continues to be added to the channel file so that there may be a plurality of messages in one channel file, the code 'start' and the code 'end' may be used.

The devices 1000, 1100, and 1200 may read the area 'sending device' of a channel file of a message sent to the devices 1000, 1100, and 1200 and confirm from which device the message is sent. Accordingly, a response message may be sent to a device written on the area 'sending device'. Also, the devices 1000, 1100, and 1200 may read area 'message type' and determine whether the message is a simple text character display, a command for performing a certain operation, or the like. For example, when the message type is a simple text character display, area 'contents of message' may be read, and the message may be displayed as it is on a screen. When the message type is a command, a command in the area 'contents of message' may be decoded, and an order corresponding to the command may be performed.

Also, the devices 1000, 1100, and 1200 may read the area 'received message check' and confirm whether the message sent to the devices 1000, 1100, and 1200 has already been read and processed. For example, if the area 'received message check' is labeled as "0", it indicates that the sent message has not been read yet. Accordingly, the devices 1000, 1100, and 1200 may process a message having the area 'received message check' labeled as "0". However, if the area 'received message check' is labeled as "F", it indicates that the sent message has already been read and processed. Accordingly, the devices 1000, 1100, and 1200 may ignore a message having the area 'received message check' labeled as "F". Whenever the devices 1000, 1100, and 1200 read and process a message, the devices 1000, 1100, and 1200 may delete a processed channel file of the devices 1000, 1100, and 1200. For example, a message that has already been read and processed has been deleted, and therefore, the area 'received message check' may be omitted in a data format of a channel file.

Figure 6:
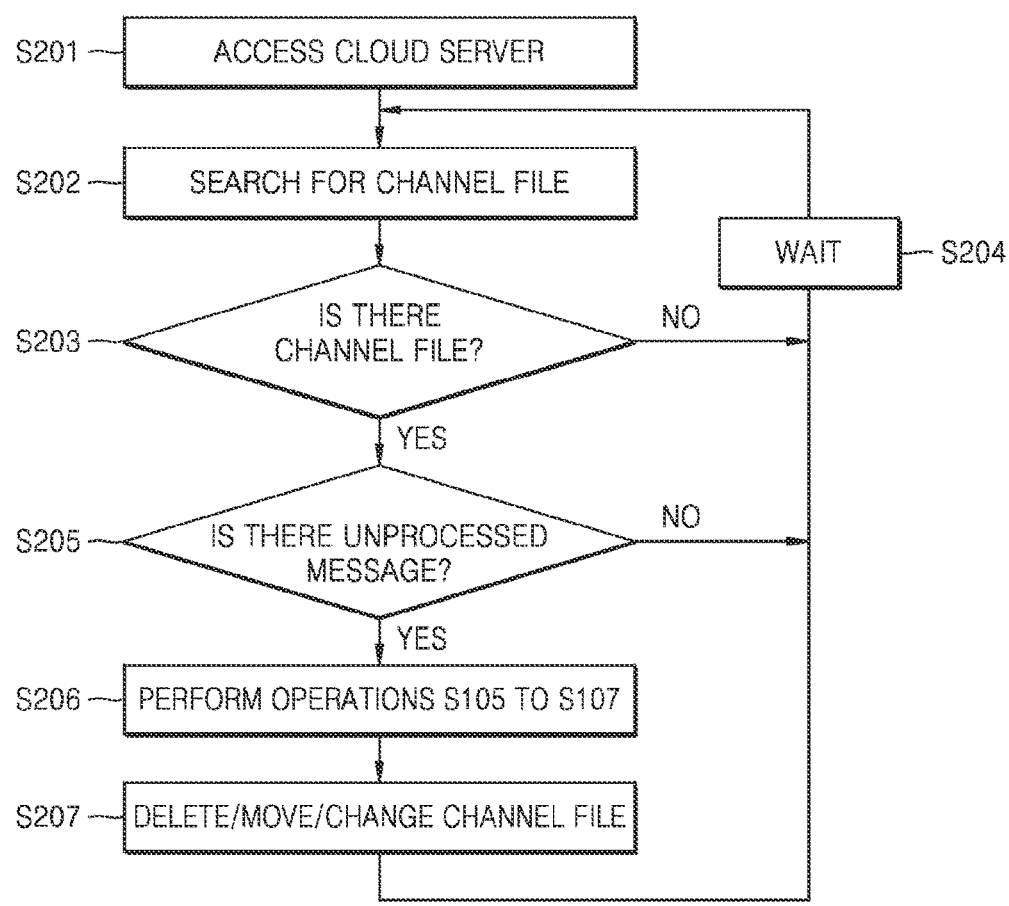
FIG. 6 is a flowchart illustrating an example process, performed by each device, of checking whether there is a message sent to the device.

Accordingly, in operations S103, S104, S108, S109, S110, and S111 of FIG. 2, receipt of a message may be checked in one or more ways. For example, whether a newly received message is present may be determined based on whether a channel file is present or whether the area 'received message check' labeled as "0" is present in a channel file. FIG. 6 is a flowchart illustrating an example process, performed by each of the devices 1000, 1100, and 1200, of checking whether there is a message sent to each of the devices 1000, 1100, and 1200.

Referring to FIG. 6, in operation S201, each of the devices 1000, 1100, and 1200 may access the cloud server 2000. As described above, each of the devices 1000, 1100, and 1200 may access the cloud server 2000 based on previously input user account information. Also, information about a location in a storage space of the cloud server 2000, where a message is to be uploaded, has been previously set on each of the devices 1000, 1100, and 1200. Accordingly, in operation S202, each of the devices 1000, 1100, and 1200 may search the storage space of the cloud server 2000, where the message is to be uploaded. For example, as in FIG. 3, folder "multi device communication" in a main folder allocated to a user account of the cloud server 2000 may be searched, or as in FIG. 4, separate folders (for example, "device 01", "device 02", and "device 03") may be searched with respect to the devices 1000, 1100, and 1200.

In operation S203, each of the devices 1000, 1100, and 1200 determines whether a channel file related to each of the devices 1000, 1100, and 1200 is present in a folder. For example, the first device 1000 may search for file "device 01.channel", the second device 1100 may search for file "device 02.channel", and the third device 1200 may search for file "device 03.channel". In operation S204, when there is no channel file, each of the devices 1000, 1100, and 1200 determines that no new message has arrived and waits for a time period. In this regard, a waiting time may be identical to a cycle for checking a message. After the waiting time passes, operations S202 to S204 may be repeated until a new message arrives.

In operation S205, when the channel file related to each of the devices 1000, 1100, and 1200 is present in the folder, each of the devices 1000, 1100, and 1200 may read a channel file of each of the devices 1000, 1100, and 1200 and check whether an unprocessed message is present in the channel file. For example, if the area 'received message check' in the channel file is read, and a message having the area 'received message check' labeled as "0" is present, it indicates that an unprocessed message is present, and therefore, operations S105 to S107 of FIG. 2 may be performed in operation S206. When there is no message having the area 'received message check' in the channel file labeled as "0", each of the devices 1000, 1100, and 1200 determines that no new message has arrived and waits for a time period in operation S204. In a case where the devices 1000, 1100, and 1200 delete a processed channel file of the devices 1000, 1100, and 1200 whenever the devices 1000, 1100, and 1200 read and process a message, checking whether an unprocessed message is present (operation S205) may be omitted.

After a new message is processed, a channel file including the processed message may be deleted, changed, or moved to another folder in operation S207. For example, whenever the devices 1000, 1100, and 1200 read and process a message, the devices 1000, 1100, and 1200 may delete a processed channel file of the devices 1000, 1100, and 1200. Alternatively, the channel file may be moved to a previously designated storage space in the cloud server 2000 so that a history of messages processed in the past may be confirmed. For example, the folder "history" may be created as a subfolder of the folder "multi device communication", and a channel file including a processed message may be moved to the folder "history". Alternatively, in a case where a new message continues to be added to one channel file, the area 'received message check' may be changed, for example, to "F", with respect to a processed message. By deleting, moving, or changing the channel file in the above-described manner, a message that has already been processed may avoid being duplicated in operations S202 to S205 repeated subsequently. Thereafter, waiting (operation S204) may be performed again, and then operations S202 to S204 may be repeated until a new message arrives.

A folder name or a name of a channel file illustrated in FIGS. 3 and 4 is merely an example for ease of understanding and is not necessarily limited thereto. Also, a data format of a channel file illustrated in FIG. 5 is just an example as well, and the format of the channel file may be different from that illustrated in FIG. 5. Accordingly, a process of storing a channel file in the cloud server 2000, reading the channel file stored in the cloud server 2000, and checking a newly received message may be performed in various ways. For example, the name of a channel file may be determined such that information such as a sending device, a receiving device, and whether receipt of a message has been checked may be obtained just by using the name of the channel file. Also, by analyzing an attribute of a channel file, a time when the channel file is stored or renewed and the last time when receipt of a message has been checked may be compared with each other. Accordingly, exemplary embodiments are not limited only by examples illustrated in FIGS. 3 to 6.

Figure 7:
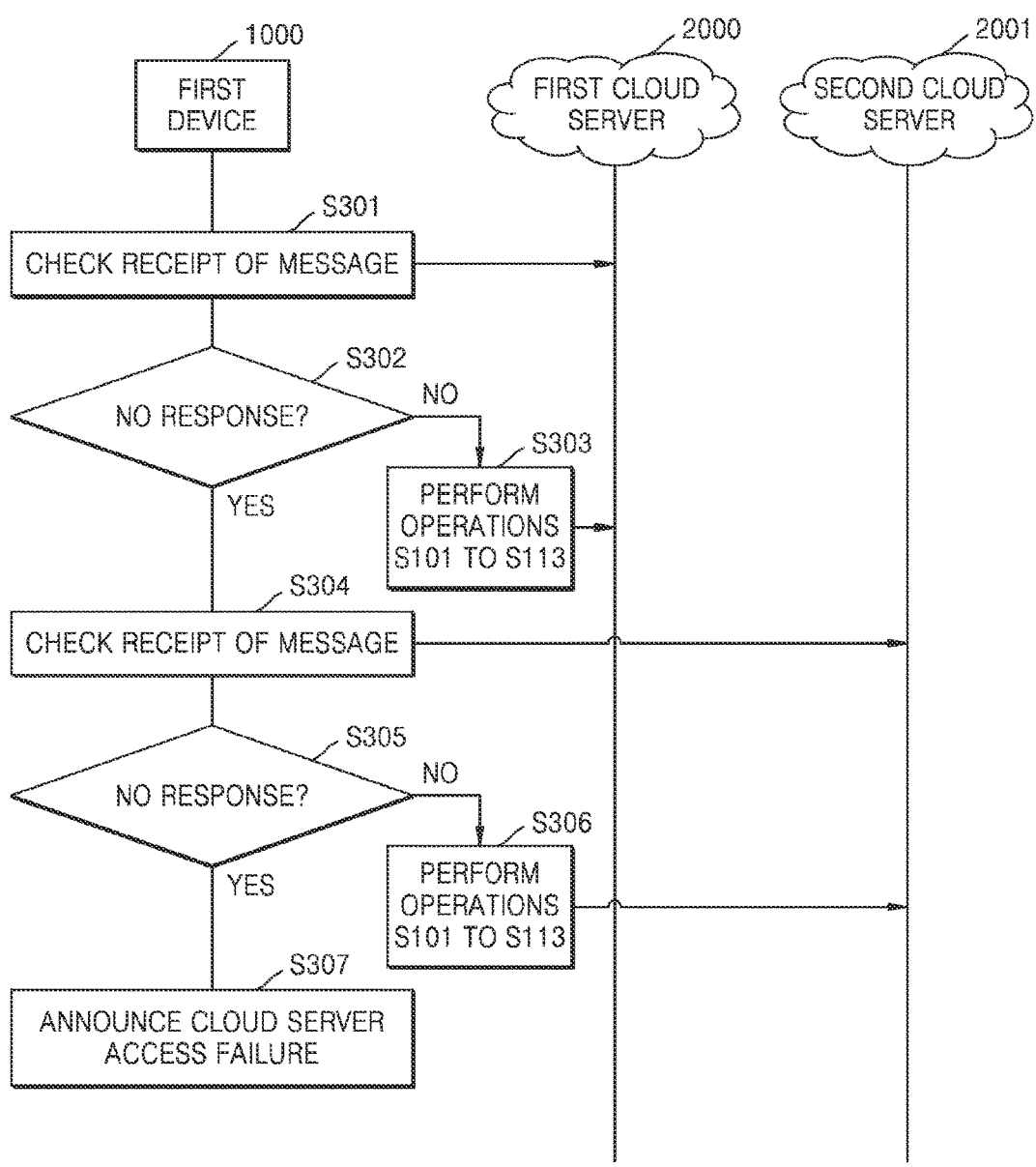
FIG. 7 is a flowchart illustrating an example method of providing communication between multi-devices by using two cloud servers.

A method of providing communication between multi-devices using one cloud server 2000 has been described so far. However, two or more cloud servers may be used, for example, in case of an error of the cloud server 2000 or the like. FIG. 7 is a flowchart illustrating an example method of providing communication between multi-devices by using two cloud servers 2000 and 2001. Although only the relationship between one device 1000 sending a message and the two cloud servers 2000 and 2001 is illustrated as an example in FIG. 7 for convenience, other devices 1100 and 1200 may also be connected to the two cloud servers 2000 and 2001. Operation flow between the first device 1000 and the two cloud servers 2000 and 2001 may be applied the same to the other devices 1100 and 1200 as well.

Referring to FIG. 7, in operation S301, the first device 1000 attempts to check the first cloud server 2000 for whether a message has been received in a manner as described, for example, with reference to FIG. 6 or the like. In operation S302, whether the first cloud server 2000 is normally accessible or whether there is no response from the first cloud server 2000 for a time period or longer is checked. When the first cloud server 2000 is normally accessible, operations S101 to S113 of FIG. 2 may be performed by using the first cloud server 2000, in operation S303. However, when there is no response from the first cloud server 2000 for a time period or longer, the first device 1000 attempts to check the second cloud server 2001 for whether a message has been received, in operation S304. For this, user account information regarding the first and second cloud servers 2000 and 2001 to be accessed and priority between the first and second cloud servers 2000 and 2001 may have been previously input to the first device 1000. The first device 1000 may attempt to access the first cloud server 2000 first according to the previously input priority and then may attempt to access the second cloud server 2001 when there is no response from the first cloud server 2000.

In operation S305, the first device 1000 checks the second cloud server 2001 for whether the second cloud server 2001 is normally accessible or whether there is no response from the second cloud server 2001 for a time period or longer. When the second cloud server 2001 is normally accessible, operations S101 to S113 of FIG. 2 may be performed by using the second cloud server 2001, in operation S306. However, when there is no response from the second cloud server 2001 for a time period or longer, the first device 1000 may display a message providing a notification on an access error of a cloud server on a screen of the first device 1000 in operation S307. In addition, the first device 1000 may attempt, again, to check the first cloud server 2000 for whether a message has been received (operation S301). Although only the two cloud servers 2000 and 2001 are illustrated in FIG. 7 for convenience, the same method may be applied to more than two cloud servers as well. For example, in a case where three cloud servers are used, when there is no response from the second cloud server 2001, the first device 1000 may attempt to check a third cloud server for whether a message has been received.

Descriptions have been made so far with assumptions that user account information regarding the cloud server 2000 has already been input to each of the devices 1000, 1100, and 1200, and a folder (for example, multi device communication) for communication between multi-devices has already been created in the cloud server 2000. However, at an initial stage where a user purchases the devices 1000, 1100, and 1200, no user account information regarding the cloud server 2000 has been input to the devices 1000, 1100, and 1200. Also, when the user first uses a communication function between multi-devices, no folder for communication between multi-devices has been created in the cloud server 2000. Accordingly, when the user starts the communication function between multi-devices, a process of inputting user account information regarding the cloud server 2000 to the devices 1000, 1100, and 1200 may be performed by the user, and a process of accessing the cloud server 200 and creating a folder for communication between multi-devices may be performed by the devices 1000, 1100, and 1200.

Figure 8:
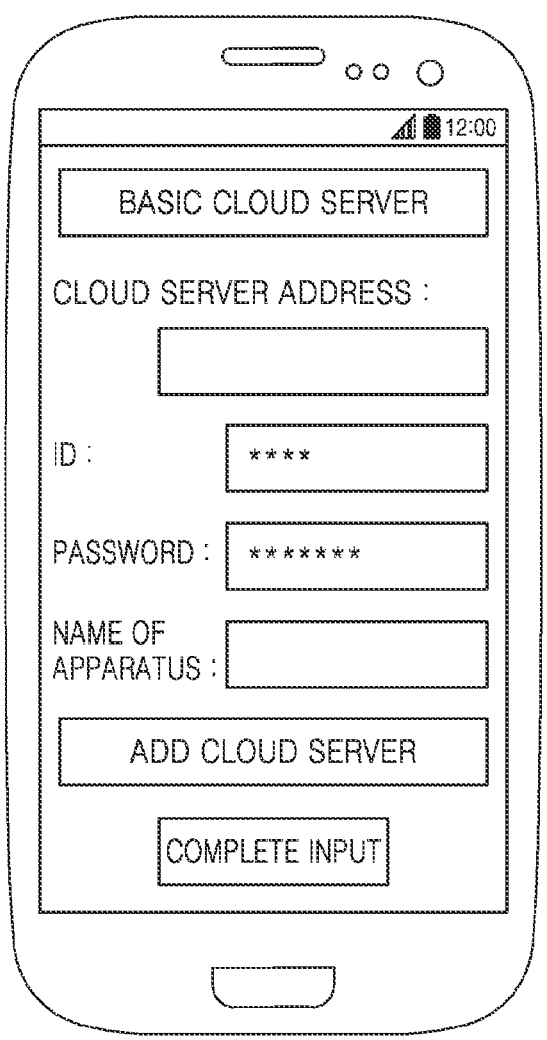
FIG. 8 illustrates an example of a user interface for inputting information regarding a cloud server to be used for performing communication between multi-devices to a device.

The process of inputting user account information regarding the cloud server 2000 to the devices 1000, 1100, and 1200 may be executed when the user selects a communication function between multi-devices from a setup menu of each of the devices 1000, 1100, and 1200. For example, FIG. 8 illustrates an example of a user interface for inputting information regarding the cloud server 2000 to be used for performing communication between multi-devices to each of the devices 1000, 1100, and 1200. As illustrated in FIG. 8, the user may input user account information, such as an address or name of the cloud server 2000, a user ID, and a password, via input screens of the devices 1000, 1100, and 1200 by using an input tool such as a touchscreen, a keyboard, or a keypad. When necessary, based on a choice of the user, user account information regarding an auxiliary second cloud server 2001 in addition to a basic first cloud server 2000 may be additionally further input to the devices 1000, 1100, and 1200. Also, the user may determine and input names or nicknames of the devices 1000, 1100, and 1200 to the devices 1000, 1100, and 1200 so as to distinguish the devices 1000, 1100, and 1200 from one another.

Once the user account information is completely input to the devices 1000, 1100, and 1200, each of the devices 1000, 1100, and 1200 may access the cloud server 2000 based on the input user account information and perform an initial operation for communication between multi-devices. For example, FIG. 9 is a flowchart illustrating an example process, performed by each of the devices 1000, 1100, and 1200, of accessing the cloud server 2000 input in FIG. 8 and registering device information regarding each of the devices 1000, 1100, and 1200.

Figure 9:
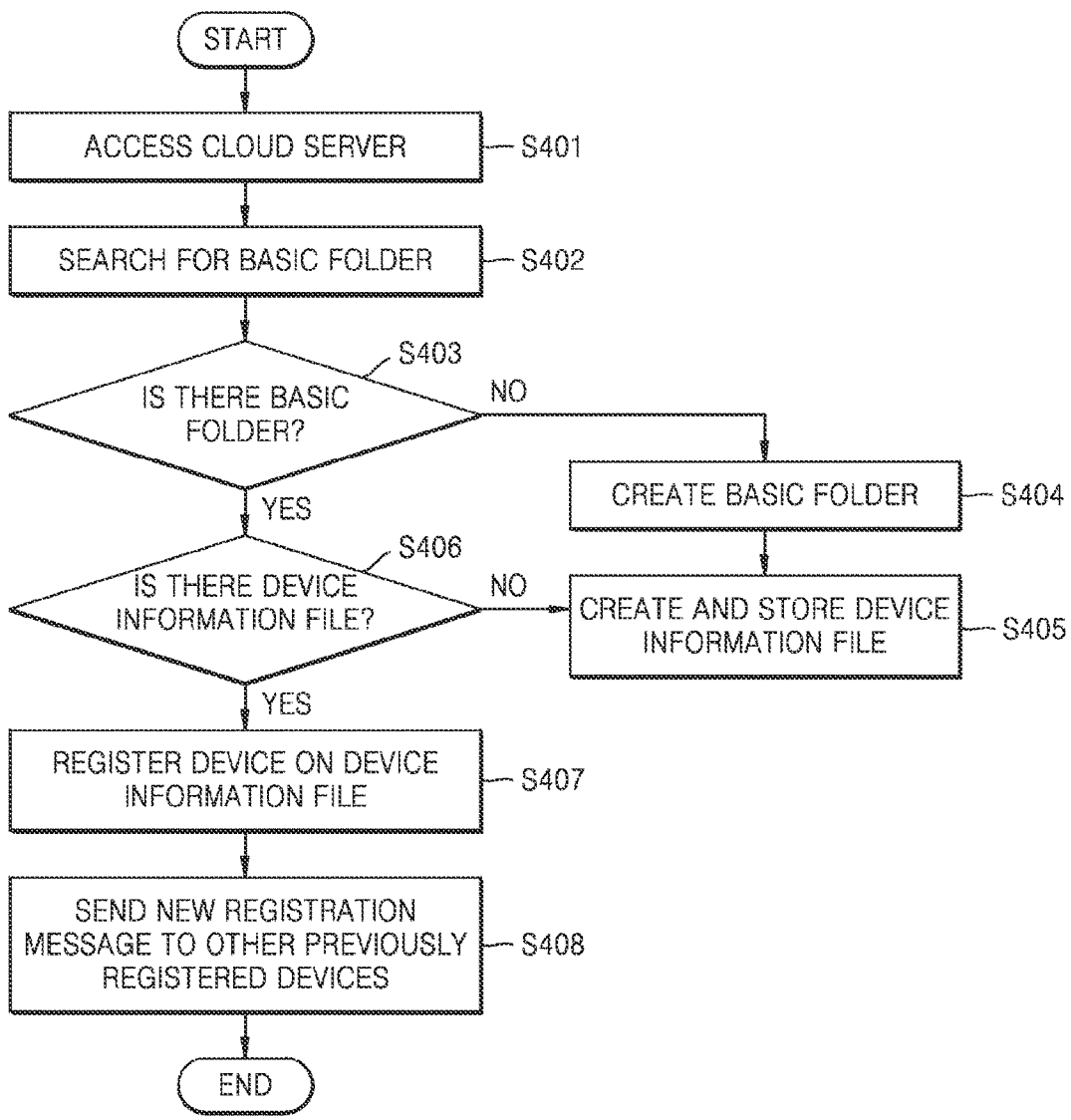
FIG. 9 is a flowchart illustrating an example process, performed by each device, of accessing the cloud server input in FIG. 8 and registering device information regarding the device.

Referring to FIG. 9, in operation S401, each of the devices 1000, 1100, and 1200 accesses the cloud server 2000 based on user account information regarding the cloud server 2000 input by the user. Thereafter, each of the devices 1000, 1100, and 1200 accesses a main folder (for example, "cloud user folder" of FIG. 3) allocated to a user account of the cloud server 2000. In operation S402, each of the devices 1000, 1100, and 1200 searches for a basic folder (for example, "multi device communication" of FIG. 3) for communication between multi-devices. A name of the basic folder may be directly selected on an initial input screen of FIG. 8 and designated by the user. Alternatively, without involvement of the user, the name of the basic folder may be inherent in the communication function of the devices 1000, 1100, and 1200.

In operation S403, the devices 1000, 1100, and 1200 determine whether a basic folder for communication between multi-devices is present in the main folder allocated to the user account of the cloud server 2000. When there is no basic folder, it is determined that communication function between multi-devices has not been performed before, and a basic folder for communication between multi-devices is created as a subfolder of the main folder in operation S404. In operation S405, the devices 1000, 1100, and 1200 may create a device information file including device information regarding the devices 1000, 1100, and 1200 and store the device information file in the basic folder. The device information file may be stored under a name such as "devices.info" illustrated in FIGS. 3 and 5. For example, the device information file may include information regarding the devices 1000, 1100, and 1200, such as a type, a model name, and a device name (or a device nickname) determined by the user. The device information file may also include information such as types of operations that may be performed by the devices 1000, 1100, and 1200 and a list of command codes for ordering the devices 1000, 1100, and 1200 to perform a certain operation. The device information file may further include a device sequence number. When the devices 1000, 1100, and 1200 first creates and stores a device information file, the devices 1000, 1100, and 1200 may designate a device sequence number of the devices 1000, 1100, and 1200 as, for example, number "01".

When a basic folder for communication between multi-devices is already present, the devices 1000, 1100, and 1200 access the basic folder and search for whether a device information file is present in the basic folder, in operation S406. When there is no device information file, the devices 1000, 1100, and 1200 may create a device information file including device information regarding the devices 1000, 1100, and 1200 and store the device information file in the basic folder, as described above (operation S405).

However, when a device information file is already present in the basic folder, the devices 1000, 1100, and 1200 register device information regarding the devices 1000, 1100, and 1200 on the existing device information file in operation S407. For example, after opening the existing device information file and adding the device information regarding the devices 1000, 1100, and 1200, which includes a device sequence number, a device type, a model name, a device name, a list of operations that may be performed, and a list of commands, thereto, the devices 1000, 1100, and 1200 may store a renewed device information file. After the existing device sequence number is found, the device sequence number may be designated so as to follow the last sequence number. For example, when a device sequence number is designated up to number "04" in the existing device information file, the devices 1000, 1100, and 1200 may designate device sequence number of the devices 1000, 1100, and 1200 as number "05" and store the device sequence number in the device information file. After each of the devices 1000, 1100, and 1200 registers device information regarding each of the devices 1000, 1100, and 1200 on the existing device information file, each of the devices 1000, 1100, and 1200 may optionally send a new registration message to other devices already registered on the device information file, in operation S408. Then, the other devices may store information regarding the newly registered devices 1000, 1100, and 1200 and display the information on screens of the other devices for notification.

Although it is illustrated in FIGS. 3 and 5 that device information regarding a plurality of devices 1000, 1100, and 1200 is included in one device information file (for example, "devices.info"), a separate device information file may be present with respect to each of the devices 1000, 1100, and 1200. For example, checking the presence of a device information file in a basic folder (operation S406) may be omitted, and each of the devices 1000, 1100, and 1200 may create a device information file regarding each of the devices 1000, 1100, and 1200 and store the device information file in the basic folder.

Figure 10:
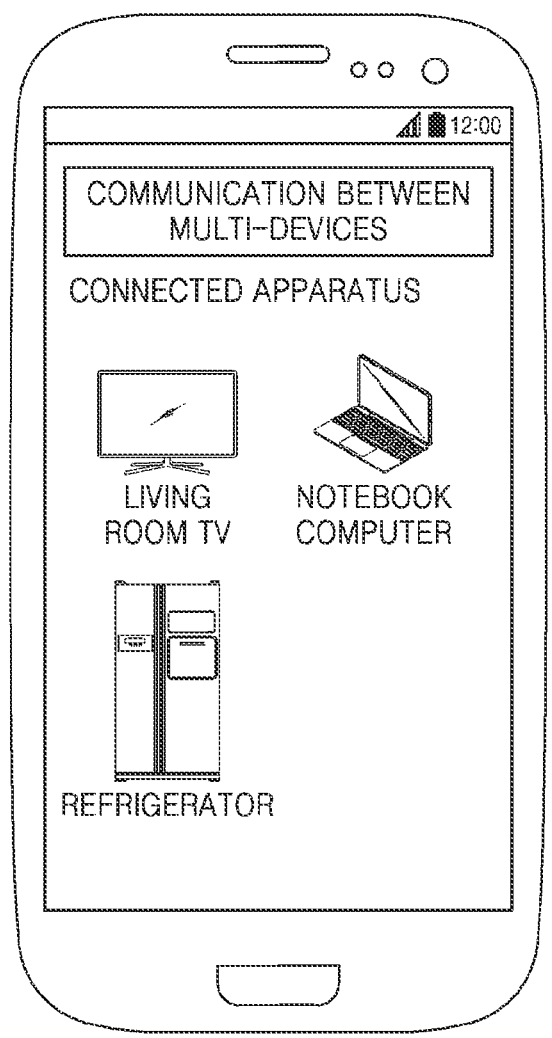
FIG. 10 illustrates an example of a user interface showing device information regarding other devices that are available for communication when communication between multi-devices is executed.

Once the registering process of FIG. 9 is complete, each of the devices 1000, 1100, and 1200 may bring, from the device information file, information regarding the other devices 1000, 1100, and 1200 that are available for communication and may display the information on a screen of each of the devices 1000, 1100, and 1200 to provide the information to the user. For example, FIG. 10 illustrates an example of a user interface showing, to a user, device information regarding other devices that are available for communication when communication between multi-devices is executed. As illustrated in FIG. 10, on the screen of each of the devices 1000, 1100, and 1200, the other devices 1000, 1100, and 1200 that are available for communication may be displayed. When necessary, the user may select at least one of the devices 1000, 1100, and 1200 displayed on the screen and may input a message or a command for performing a certain operation regarding the at least one of the devices 1000, 1100, and 1200. Then, as in the flowchart of FIG. 2, the message or the command for performing a certain operation may be sent to the at least one of the devices 1000, 1100, and 1200.

The user may deselect a communication function between multi-devices via a setup menu of the devices 1000, 1100, and 1200. Then, the communication function between multi-devices may be deactivated, and the devices 1000, 1100, and 1200 may deregister device information regarding the devices 1000, 1100, and 1200 from the device information file. For example, FIG. 11 is a flowchart illustrating an example process, performed by each of the devices 1000, 1100, and 1200, of accessing the cloud server 2000 input in FIG. 8 and deregistering device information regarding each of the devices 1000, 1100, and 1200.

Figure 11:
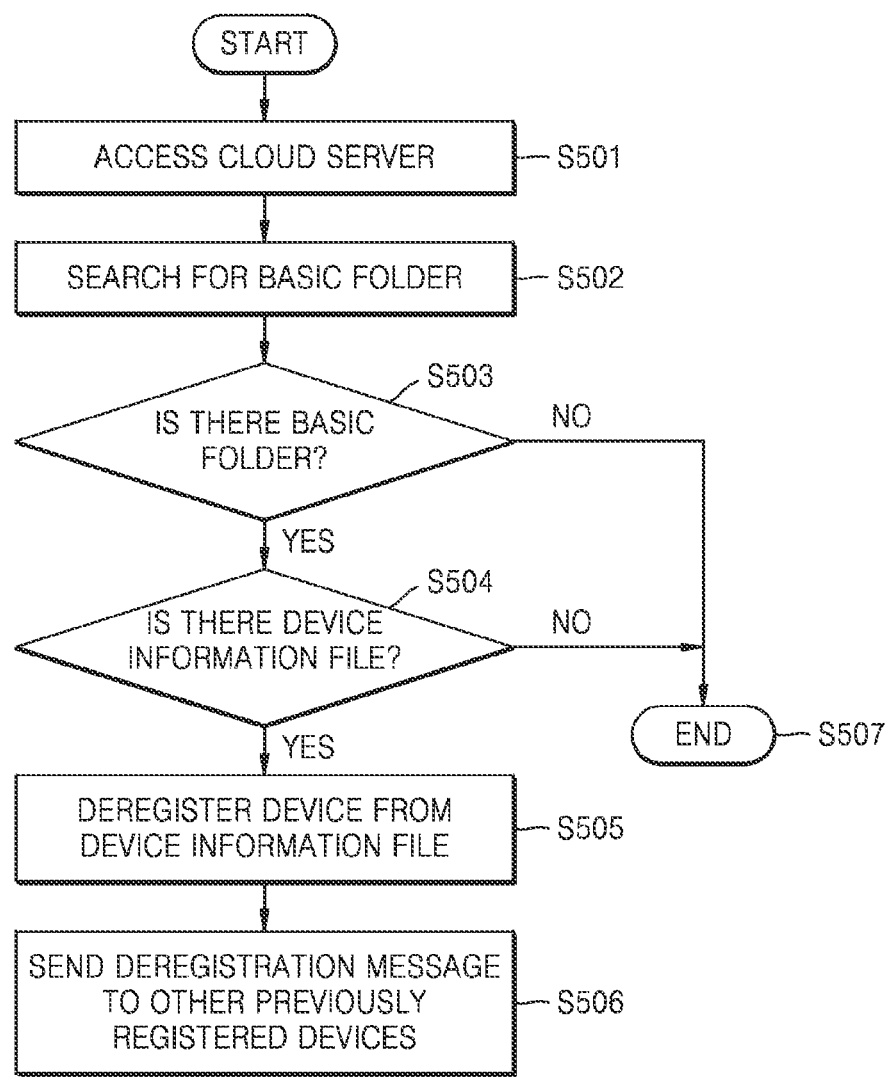
FIG. 11 is a flowchart illustrating an example process, performed by each device, of accessing the cloud server input in FIG. 8 and deregistering device information regarding the device.

Referring to FIG. 11, in operation S501, each of the devices 1000, 1100, and 1200 accesses the cloud server 2000 based on user account information regarding the cloud server 2000 input by the user. In operation S502, the devices 1000, 1100, and 1200 access a main folder (for example, "cloud user folder" of FIG. 3) allocated to a user account of the cloud server 2000 and search for a basic folder (for example, "multi device communication" of FIG. 3) for communication between multi-devices. In operation S503, the devices 1000, 1100, and 1200 determine whether a basic folder for communication between multi-devices is present in the main folder allocated to the user account of the cloud server 2000. When there is no basic folder for communication between multi-devices, the devices 1000, 1100, and 1200 may terminate the deregistering process, in operation S507. In this regard, the devices 1000, 1100, and 1200 may display the termination of the deregistering process on screens of the devices 1000, 1100, and 1200.

In operation S504, when a basic folder for communication between multi-devices is already present, the devices 1000, 1100, and 1200 access the basic folder and search for whether a device information file is present in the basic folder. When there is no device information file, the devices 1000, 1100, and 1200 may terminate the deregistering process (operation S507). In this regard, the devices 1000, 1100, and 1200 may display the termination of the deregistering process on screens of the devices 1000, 1100, and 1200.

However, when a device information file is present in the basic folder, the devices 1000, 1100, and 1200 may open the device information file and deregister device registration, in operation S505. For example, the devices 1000, 1100, and 1200 may delete device information regarding the devices 1000, 1100, and 1200, recorded on the device information file, and then may store a renewed device information file. For example, the devices 1000, 1100, and 1200 may remember a device sequence number of the devices 1000, 1100, and 1200 that is obtained in time of device registration and may delete device information corresponding to the device sequence number from the device information file. After the devices 1000, 1100, and 1200 delete device information regarding the devices 1000, 1100, and 1200 from the device information file, the devices 1000, 1100, and 1200 may optionally send a deregistration message to other devices registered on the device information file, in operation S506. Then, the other devices may delete information regarding the deregistered devices 1000, 1100, and 1200 and display the information on screens of the other devices for notification.

Figure 12:
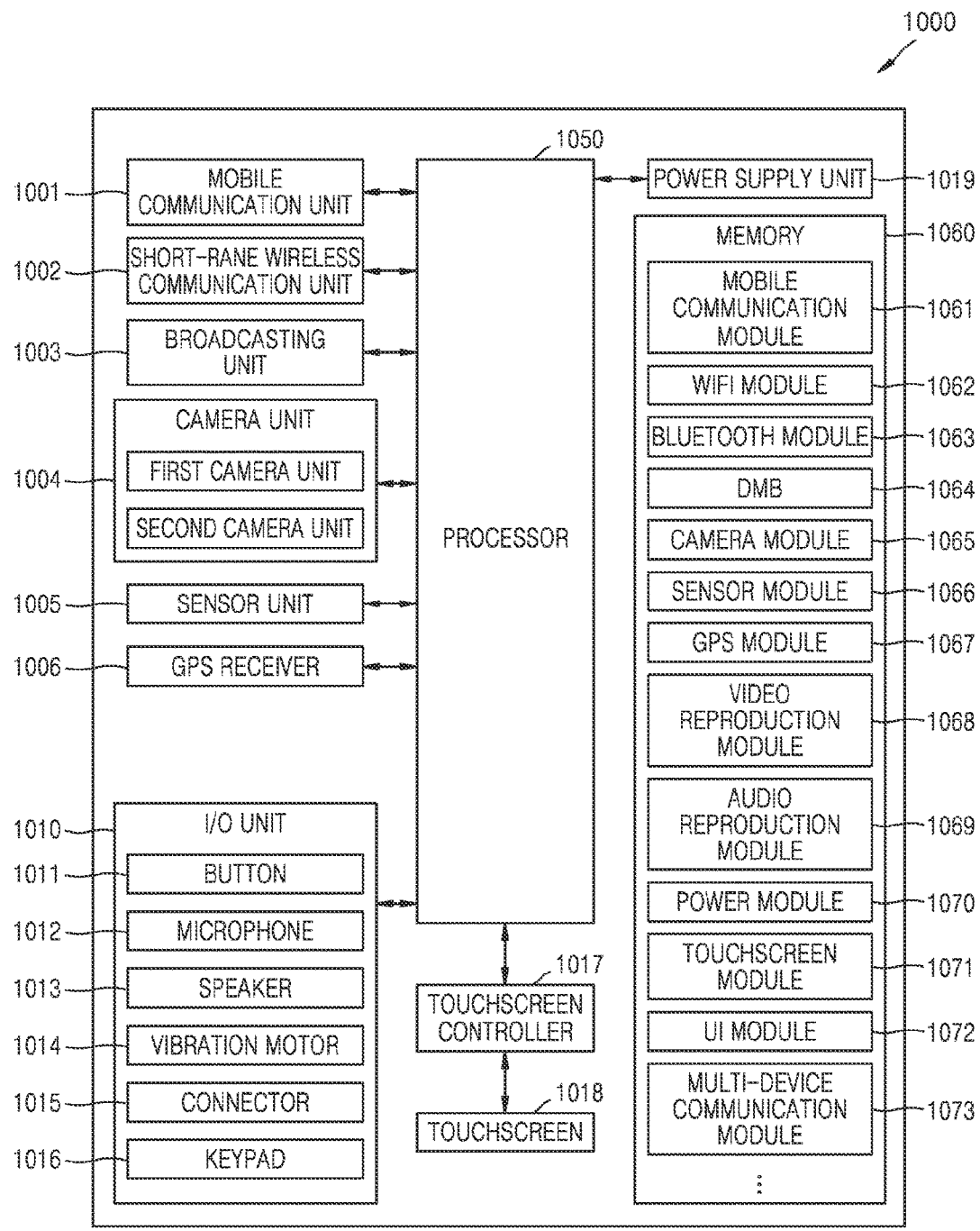
FIG. 12 is a block diagram illustrating example configurations of a device capable of performing communication between multi-devices.

FIG. 12 is a block diagram illustrating configurations of an example device 1000 capable of performing communication between multi-devices, according to an example embodiment. Although not illustrated, the other devices 1100 and 1200 may also include configurations as illustrated in FIG. 12. However, the configurations of the device 1000 illustrated in FIG. 12 are just an example, and some of the configurations illustrated in FIG. 12 may be omitted or configurations not illustrated in FIG. 12 may be further added depending on the type of the devices 1000, 1100, and 1200.

Referring to FIG. 12, a mobile communication unit 1001 may include circuitry configured to transmit or receive a wireless signal to or from at least one of a base station, an external terminal, and a server over a mobile communications network. In this regard, the wireless signal may include an audio signal, a video call signal, or various forms of data according to text/multimedia message transmission and reception.

A short-range wireless communication unit 1002 performs a function for short-range wireless communication. The short-range wireless communication unit 1002 may include a Bluetooth communication unit, a Bluetooth low energy (BLE) communication unit, a near field communication unit, a wireless local area network (WLAN) communication unit, a ZigBee communication unit, an Infrared Data Association (IrDA) communication unit, a Wi-Fi Direct (WFD) communication unit, an ultra wideband (UWB) communication unit, or an Ant+ communication unit, but are not limited thereto.

A broadcasting unit 1003 receives a digital multimedia broadcasting (DMB) signal. A camera unit 1004 includes a lens and optical devices for photographing or videoing.

A sensor unit 1005 may include a variety of sensors, including, for example, a gravity sensor sensing movement of a device, an luminance sensor sensing brightness of light, a proximity sensor sensing proximity of a person, or a motion sensor sensing a motion of a person.

A GPS receiver 1006 receives a global positioning system (GPS) signal from an artificial satellite. Such a GPS signal may be used to provide a variety of services to a user of the device 1000.

An input/output unit 1010 may provide an interface with an external device or the user and may include a button 1011, a microphone 1012, a speaker 1013, a vibration motor 1014, a connector 1015, a keypad 1016, or the like.

A touchscreen 1018 receives a touch input of the user. A touchscreen controller 1017 delivers a touch input inputted via the touchscreen 1018 to a processor 1050. A power supply unit 1019 is connected to a battery or an external power source to supply power necessary for a device.

The processor 1050 executes programs stored in a memory 1060. For example, the processor 1050 processes communication between the devices 1000, 1100, and 1200, as described above, by executing a multi-device communication module 1073.

Also, the term "unit" used herein may be a hardware component and/or a software component implemented by a hardware component.

The programs stored in the memory 1060 may be classified into a plurality of modules according to the function of the programs. For example, the programs stored in the memory 1060 may be classified into a mobile communication module 1061, a Wi-Fi module 1062, a Bluetooth module 1063, a DMB module 1064, a camera module 1065, a sensor module 1066, a GPS module 1067, a video playback module 1068, an audio playback module 1069, a power module 1070, a touchscreen module 1071, a UI module 1072, the multi-device communication module 1073, and the like.

Since a function of each of the modules may be inferred from a name of each of the modules by one of ordinary skill in the art, only the multi-device communication module 1073 will be described below.

The multi-device communication module 1073 may be activated when a communication function between multi-devices is selected via setting of the devices 1000, 1100, and 1200. The multi-device communication module 1073, for example, may include commands for performing the method of communication between multi-devices as illustrated, for example, in FIGS. 1 to 11. At an early stage where the multi-device communication module 1073 is activated, the multi-device communication module 1073 may perform a process of accessing the cloud server 2000 and registering device information regarding a device of the user according to the method of FIG. 9. Thereafter, the multi-device communication module 1073 may perform a process of checking receipt of a message according to the method of FIG. 6. In addition, when the user inputs a message and gives an order to send the message to another device, the multi-device communication module 1073 may perform the method of FIG. 2 according to the order. When the user deselects the communication function between multi-devices via setting of the devices 1000, 1100, and 1200, the multi-device communication module 1073 may perform the method of FIG. 11 and then may be deactivated. A function of the multi-device communication module 1073 has been generally described, but is not limited to the above description. A detailed function of the multi-device communication module 1073 may be inferred from the descriptions of FIGS. 1 to 11.

The multi-device communication module 1073 may be implemented, for example, at a level of application programming interface (API). Accordingly, the user is not involved in an operation of the multi-device communication module 1073 except when the user inputs, to each of the devices 1000, 1100, and 1200 of the user, a user account of the cloud server 2000, or a message or a command that is to be sent to the other devices 1000, 1100, and 1200 of the user. Accordingly, there is no inconvenience of having to additionally install an application program for performing communication between multi-devices in each of the devices 1000, 1100, and 120. Also, the multi-device communication module 1073 may provide, to the user, an interface for inputting a message or a command.

A method of providing communication between multi-devices, according to example embodiments may be realized in a form of a recording medium including a program module executed by a computer and a command executed by the same computer. A computer readable medium includes an arbitrary available medium and also includes volatile and non-volatile media and removable and non-removable media. Additionally, a computer readable medium may include a computer storage medium and a communication medium. The computer storage medium includes volatile and non-volatile media and removable and non-removable media, which are realized through an arbitrary method or technique for storing information on a computer readable command, a data structure, a program module, or other data. The communication medium typically includes a computer readable command, a data structure, a program module, or other data of a modulated data signal.

While one or more example embodiments have been described with reference to the figures, it will be understood by those of ordinary skill in the art that various changes in form and details may be made therein without departing from the spirit and scope as defined by the following claims. Therefore, it should be understood that example embodiments described herein should be considered in a descriptive sense only and not for purposes of limitation. For example, each single element may be separated into multiple elements which are then separately implemented. Also, separated elements may be combined together and implemented as a single element.

The scope of the disclosure is indicated by the following claims rather than by the above detailed description, and it should be understood that the claims and all modifications or modified forms drawn from the concept of the claims are included in the scope of the disclosure.

What is claimed is:

1. A method of providing communication between multiple devices, comprising:
  generating, by a first device, a message to be sent to a second device, the second device being different from the first device, the message including a command to the second device to perform a certain operation;
  storing, by the first device, the message in a previously designated storage space of a cloud server;
  searching, by the second device, the previously designated storage space of the cloud server and reading, by the second device, a message sent to the second device;

processing, by the second device, the message sent to the second device; and executing, by the second device, the command, wherein the method further comprises accessing, by the first device, the cloud server and registering, by the first device, device information regarding the first device, and wherein the registering of the device information regarding the first device comprises:

receiving an input of a user account of the cloud server;

accessing the cloud server based on the input user account;

searching for a device information file stored in the previously designated storage space of the cloud server; and adding the device information regarding the first device to the device information file and storing a renewed device information file.

2. The method of claim 1, wherein the first device and the second device access the cloud server based on the same user account information regarding the cloud server.

3. The method of claim 2, wherein the previously designated storage space of the cloud server comprises at least one of a folder allocated to a user account of the cloud server and a subfolder of the folder.

4. The method of claim 1, wherein the first device and the second device access the cloud server based on different pieces of user account information.

5. The method of claim 4, wherein the previously designated storage space of the cloud server comprises a common storage space of the cloud server shared by different user accounts.

6. The method of claim 1, wherein the first device stores the message to be sent to the second device as a file comprising contents of the message in the previously designated storage space of the cloud server.

7. The method of claim 6, wherein at least one file comprising contents of a message is stored in the previously designated storage space of the cloud server, and each of the at least one file corresponds to a device that is to receive a message included in each of the at least one file.

8. The method of claim 6, wherein at least one folder for storing the file comprising the contents of the message is created in the previously designated storage space of the cloud server, and each of the at least one folder corresponds to a device that is to receive a message included in a file stored in each of the at least one folder.

9. The method of claim 6, wherein the file comprises the contents of the message, and information regarding a device sending the message.

10. The method of claim 1, further comprising:

generating, by the second device, a response message to be sent to the first device after the processing of the message sent to the second device;

storing, by the second device, the response message in the previously designated storage space of the cloud server;

searching, by the first device, the previously designated storage space of the cloud server and reading, by the first device, a response message sent to the first device; and processing, by the first device, the response message sent to the first device.

11. The method of claim 1, further comprising accessing the cloud server and checking, by the first and second devices, whether there is a message sent to the first and second devices, respectively.

12. The method of claim 11, wherein, when there is no message sent to the first and second devices, the first and second devices periodically repeat checking whether there is a message sent to the first and second devices until a received message is found.

13. The method of claim 1, wherein the cloud server comprises a first cloud server and a second cloud server different from the first cloud server, and the first device stores the message to be sent to the second device in a previously designated storage space of the first cloud server when there is a response from the first cloud server, and stores the message to be sent to the second device in a previously designated storage space of the second cloud server when there is no response from the first cloud server.

14. The method of claim 1, further comprising, when there is no device information file in the previously designated storage space of the cloud server, creating a device information file comprising the device information regarding the first device and storing the device information file in the previously designated storage space of the cloud server.

15. A method of performing communication between devices using a cloud server, the method performed by a device and comprising:

generating a message to be sent to another device, the message including a command to the other device to perform a certain operation;

accessing the cloud server based on previously input user account information and storing the message as a file in a previously designated storage space of the cloud server;

searching the previously designated storage space of the cloud server and checking whether a file comprising a message sent to the device from another device has been stored;

when there is the file comprising the message sent to the device, reading and processing the message sent to the device; and when the message sent to the device includes a command to the device to perform a certain operation, executing the command to the device, wherein the method further comprises registering device information regarding the device, and wherein the registering of the device information regarding the device comprises:

receiving an input of a user account of the cloud server;

accessing the cloud server based on the input user account;

searching for a device information file stored in the previously designated storage space of the cloud server; and adding the device information regarding the device to the device information file and storing a renewed device information file.

16. The method of claim 15, wherein the previously designated storage space of the cloud server comprises a folder allocated to a user account of the cloud server or a subfolder of the folder.

17. The method of claim 15, further comprising, when there is no device information file in the previously designated storage space of the cloud server, creating a device information file comprising the device information regarding the device and storing the device information file in the previously designated storage space of the cloud server.

18. The method of claim 17, further comprising obtaining information regarding other devices capable of performing communication with the device from the device information file.

19. A non-transitory computer-readable recording medium having recorded thereon a program for performing, when executed by a computer, the method of claim 15.

20. A device comprising:
- a memory configured to store at least one program; and
- a processor configured to perform communication between multiple devices by executing the at least one program,
- wherein the at least one program comprises commands for:
  - generating a message to be sent to another device, the message including a command to the other device to perform a certain operation;
  - accessing a cloud server based on previously input user account information and storing the message as a file in a previously designated storage space of the cloud server;
  - searching the previously designated storage space of the cloud server and checking whether a file comprising a message sent to the device from the other device has been stored;
  - when there is the file comprising the message sent to the device, reading and processing the message sent to the device; and
  - when the message sent to the device includes a command to the device to perform a certain operation, executing the command to the device,
- wherein the at least one program further comprises commands for registering device information regarding the device, and
- wherein the registering of the device information regarding the device comprises:
  - receiving an input of a user account of the cloud server;
  - accessing the cloud server based on the input user account;
  - searching for a device information file stored in the previously designated storage space of the cloud server; and
  - adding the device information regarding the device to the device information file and storing a renewed device information file.

\* \* \* \* \*